(12) United States Patent
Imada et al.

(10) Patent No.: US 6,364,284 B1
(45) Date of Patent: Apr. 2, 2002

(54) THROTTLE VALVE CONTROL DEVICE FOR AN INTERNAL COMBUSTION ENGINE

(75) Inventors: Kensuke Imada, Hyogo; Mikihiko Suzuki; Takeshi Sugiyama, both of Tokyo, all of (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/426,002

(22) Filed: Oct. 25, 1999

(30) Foreign Application Priority Data

Mar. 30, 1999 (JP) .......................................... 11-090078

(51) Int. Cl.[7] .............................................. K16K 31/44
(52) U.S. Cl. ................................. 251/248; 251/250.05
(58) Field of Search ............................. 251/248, 250.5; 475/345, 331

(56) References Cited

U.S. PATENT DOCUMENTS 3,081,648 A * 3/1963 Duer
4,651,575 A * 3/1987 Morishita et al.
4,712,451 A * 12/1987 Morishita et al.
5,127,279 A * 7/1992 Bartruff
6,092,506 A * 7/2000 Takagi et al.

FOREIGN PATENT DOCUMENTS

JP  6-65854   8/1994
JP  7-1016    1/1995

* cited by examiner

Primary Examiner—Philippe Derakshani
Assistant Examiner—D. Austin Bonderer
(74) Attorney, Agent, or Firm—Sughrue Mion, PLLC

(57) ABSTRACT

A throttle valve controller for an internal combustion engine in which a ring gear comprises a center body, a teeth portion, at least one rotation detent portion and at least one contraction detent portion for preventing the ring gear from rotation along the peripheral direction of the ring gear, wherein the rotation detent portion and the contraction detent portion are arranged with equal spacing along the peripheral direction of the ring gear. As a result, accuracy of the circularity of the ring gear is improved.

12 Claims, 19 Drawing Sheets

THROTTLE VALVE CONTROL DEVICE FOR AN INTERNAL COMBUSTION ENGINE

BACKGROUND OF THE INVENTION

1. Field of the Invention

The present invention relates to a throttle valve control device for an internal combustion engine for transmitting rotation of a motor depending on an input of an accelerator pedal to a valve shaft of a throttle valve for adjusting amount of intake air to an internal combustion engine through a gear train unit consisting of a sun gear, a ring gear of an inner teeth type and planetary gear mating to foregoing gears.

2. Description of the Prior Art

FIG. 16 to FIG. 19 illustrate prior arts which have been filed by the present applicant but not yet been laid open to public: FIG. 16 is a side view partially cut away the throttle valve device for an internal combustion engine, FIG. 17 is a sectional view of FIG. 16 along line D—D, FIG. 18 is a front view of the valve housing and FIG. 19 is a front view of the ring gear. In FIG. 16, 1 is an internal combustion engine, 2 is a throttle valve, 3 is a valve housing of the throttle valve 2, 5 is a valve shaft being rotably provided in the value housing 3 a crossing an intake air passage 4, 6 is a valve body attached to the valve shaft 5, 7 is a intake pipe such as a manifold to connect the intake air passage 4 to unshown intake air hole, 8 is a motor such as DC brushless motor arranged with abutment to the throttle valve 2, 9 is a motor housing of the motor 8, 10 is a stator stored in the motor housing 9, 11 is a rotor being a counterpart of the stator 10, 12 is a out put shaft to which the rotor 11 is attached, 13 is a bearing rotatably supporting one end of the output shaft 9 at the motor housing 9, and 14 is a terminal which is connected to the coil of the stator 10 and assembled into the motor housing 9. According to arrangement of the motor 8 and the throttle valve 2 with mutual abutment thereof, rotation center of the output shaft 12 and that of the valve shaft are placed coaxially on a single straight line as shown by a chain with a single dot line and the other end of the output shaft 12 and an end of the valve shaft 5 are placed facing mutually with a gap, and the end face of the opening of the motor housing 9 formed annularly along periphery on the other side of the output shaft 12 and the end face of the opening of the valve housing 3 formed annularly along periphery of one side of the valve housing 3 are arranged to be butt jointed; in this arrangement with mutual abutment of the throttle value 2 and the motor 8, a gear train unit 16 is assembled into an inner space 15 which is hermetically sealed by the valve housing 3 and the motor housing 9; the gear train unit 16 consists of a sun gear 17, a ring gear of inner teeth type and a planetary gear 19 mating with foregoing gears; the sun gear 17 is arranged to rotate together with the output shaft 12 of the motor 8 and the rotation center of the sun gear and that of the value shaft 5 are arranged coaxially facing each other; the ring gear 18 is provided with a center body 181 having a rigidity, a teeth portion 182 made of a synthetic resin being die molded with respect to the center body 181 and rotation detent portions 183 made of a synthetic resin die molded with respect to the center body those of which are integrated to a single body; the teeth portion 182 of the ring gear 18 is arranged coaxially with and around the sun gear 17, and the center hole portion 184 of the ring gear 18 is arranged coaxially with and rotatably to the output shaft 12 through the bearing 20; the peripheral surface of the ring gear 18 on the side of the teeth portion 182 contacts with the inner peripheral surface of the value housing 3 and that of the motor housing 9 those of which form the inner space, and the ring gear 18 is fixed to the valve housing 3 and the motor housing 9; the rotation center of the planetary gear 19 is coupled to the supporting member 21 fixed to an end of the valve shaft 5 so as to be rotatable together with the valve shaft 5 through the supporting rod 22; in this way, after the gear train unit 16 is assembled into the inner space 15, the valve housing 3 and the motor housing 9 are mutually connected by means of unshown securing means such as a bolt; 23 is a spring such that the valve body 6 exerts a force on supporting member 21 for bringing back the intake air passage to the position of an intermediate opening; 24 is a control unit for supplying electric power to the terminal 14 of the motor 2, 25 is a accelerator pedal, and 26 is accelerator sensor for outputting electrical signal obtained through conversion of detection value of the input of the accelerator pedal 25 to the control unit 24.

Description is subsequently given of the operation of the throttle value control unit. When the accelerator pedal 25 is operated, the accelerator sensor 26 detecting the input of the accelerator pedal outputs an electric signal to the control unit 24 and the control unit 24 supplies an electric power corresponding to the electric signal from the accelerator sensor to the terminal 14 of the motor 8; the stator 10 produces a rotating magnetic field depending on the electric current flowing through the coil of the stator 10; the output shaft 12 rotates due to the attraction and repulsion caused by the rotating magnetic field produced by the stator 10 and the magnetic field in possession of the rotor 11, and in turn the sun gear 17 rotates together with the output shaft 12; and then the planetary gear 19 performs a revolution centering on the sun gear 17 and a rotation centering on the supporting rod 22; and by virtue of the revolution of the planetary gear the valve shaft 5 rotates through the supporting rod 21, and by the rotation of the valve body 6, sectional area of the intake air passage is adjusted. Thus, the gear train unit 16 consisting of the sun gear 17, the ring gear 18 and the planetary gear 19 transmit the rotation of the motor 2 depending on the input of the accelerator pedal 25 to the valve shaft 5 of the valve 2 for adjusting the amount of intake air to the internal combustion engine 1 through the supporting member 21.

In FIG. 17, the ring gear 18 comprises a plurality of rotation detent portions 183 and yet these detent portions 183 are provided by a number which is required in order to satisfy the strength at an arbitrary positions and are stored in the valve housing 3 with engagement to the valve housing and thereby preventing the ring gear 18 from rotation along peripheral direction. In FIG. 18, the valve housing 3 is formed of groove shaped engagement portions 3a on the inner peripheral surface which forms the inner space 15 as shown by FIG. 16 and these engagement portions 3a are arranged at three positions of P11~P13 out of four positions of P11~P14 which are intersecting points of the inner peripheral surface with two straight lines of L12 and L13 which intersect perpendicularly; the valve housing is provided with, outwardly from the center and concentric circularly, a through hole 36 for valve shaft, a recessed portion 3c for receiving the bearing, a spring guide positioning portion 3d, and a recessed portion 3e for reception of the spring; outside the recessed portion 3e for reception of spring, a supporting member clearance groove 3f and a spring guide stopper clearance groove 3g are arranged; on outer peripheral surface of the valve housing 3, an air hole 3h penetrating between outside and inside thereof is provided; when the unit consisting of the throttle valve 2 and the motor 8 is installed to an internal combustion engine 1, the air hole 3h is directed toward ground and thus water collected by dew condensation in the inner space 15 is drained out through the air hole 3h.

In FIG. 19, a plurality of rotation detent portions 183 project to outside along radial directions from the outer peripheral surface of the ring gear at three positions of P1~P3 out of four positions of P1, P2, P3, P4 defined by intersections of the peripheral surface with two straight lines L12, L13 intersecting perpendicularly each other. When the ring gear 18 is inserted to the valve housing 3 to engage with it, because the rotation detent portions 183 is inserted to the engagement portions 3a separately, the ring gear 18 is placed in the valve housing 3 so as not to rotate as shown by FIG. 17.

SUMMARY OF THE INVENTION

In the aforementioned conventional throttle valve control device, since the rotation detent portions 183 are not arranged along the peripheral direction with equidistance, there may the be a possibility of the circularity of the teeth portion 182 formed inside of a deterioration of the center body 181 because of a contraction of the synthetic resin after the formation of the synthetic resin. Result of measurement of the circularity is shown by the dotted line $L_{11}$ in FIG. 8. According to this dotted line $L_{11}$, as to the pitch circle of the teeth portion 182, generation of deformation of 0.20 mm from −0.15 mm to +0.05 mm may be acknowledged.

The object of the present invention is to provide a throttle valve control device for an internal combustion engine which is provided with a ring gear with an improved accuracy of circularity of that gear.

A throttle valve control device for an internal combustion engine according to the invention of claim 1 comprises a gear train unit which consists of a sun gear for transmitting the rotation of an output shaft to a valve shaft of a throttle valve, a ring gear of an inner teeth type and a planetary gear mating to the sun gear and the ring gear and the sun gear, the ring gear and the planetary gear are arranged in a space formed by making a butt joint of a valve housing for the throttle valve for adjusting amount of intake air to the internal combustion engine and a motor housing of a motor for rotating the output shaft depending on an input of an accelerator pedal, wherein the ring gear comprises a center body having a rigidity, a teeth portion made of a synthetic resin being die molded with respect to said center body through a die, rotation detent portions for preventing said ring gear, which are stored in and fitted to at least either one of the valve housing or motor housing, from rotation along peripheral direction of the ring gear and contraction detent portion(s) of the teeth portion with respect to the center body, and the rotation detent portion(s) and the contraction detent portion(s) arranged along a peripheral direction of the ring gear with an equidistance.

In a throttle valve control device for an international combustion engine according to claim 2, a plurality of the rotation detent portion(s) as recited in claim 1 and a plurality of the contraction detent portion(s) as recited in claim 1 are provided.

In a throttle valve control device for an internal combustion engine according to claim 3, the contraction detent portion(s) as recited in claim 1 is (are) formed by a synthetic resin within a minimum size which is defined by a flowable synthetic resin into a molding die.

In a throttle valve control device for an internal combustion engine according to claim 4, the contraction detent portion or portion(s) as recited in claim 1 is(are) fixed to the center body.

In a throttle valve control device for an internal combustion engine according to claim 5, center body as recited in claim 1 is made of a metal.

In a throttle valve control device for an internal combustion engine according to claim 6, the center body as recited in claim 1 is formed by drawing.

In a throttle valve control device for an internal combustion engine according to claim 7, the center body and the teeth portion as recited in claim 1 are integrated to a single body by filling in and solidifying a molding material of the teeth portion after placing the center portion into a molding space of a molding die of the teeth portion.

In a throttle valve control device for an internal combustion engine according to claim 8, the sun gear as recited in claim 1 comprises a central hole portion for arranging the center body coaxially with the sun gear.

In a throttle valve control device for an internal combustion engine according to claim 9, the center body as recited in claim 1 comprises a peripheral wall which engages inscribably with both of an inner peripheral surface of the valve housing and an inner peripheral surface of the motor housing, those of which form the inner space.

In a throttle valve control device for an internal combustion engine according to claim 10, the center body as recited claim 1 comprises a connecting means of synthetic resin of the teeth portion.

In a throttle valve control device for an internal combustion engine according to claim 11, the connecting means of synthetic resin as recited in claim 10 is a through hole.

In a throttle valve control device for an internal combustion engine according to claim 12, the teeth portion as recited in claim 8 comprises an engagement portion which contacts with the motor housing on the outer peripheral surface of the central hole of the center body.

DESCRIPTION OF THE PREFERRED EMBODIMENTS

Embodiment 1

Figure 1:
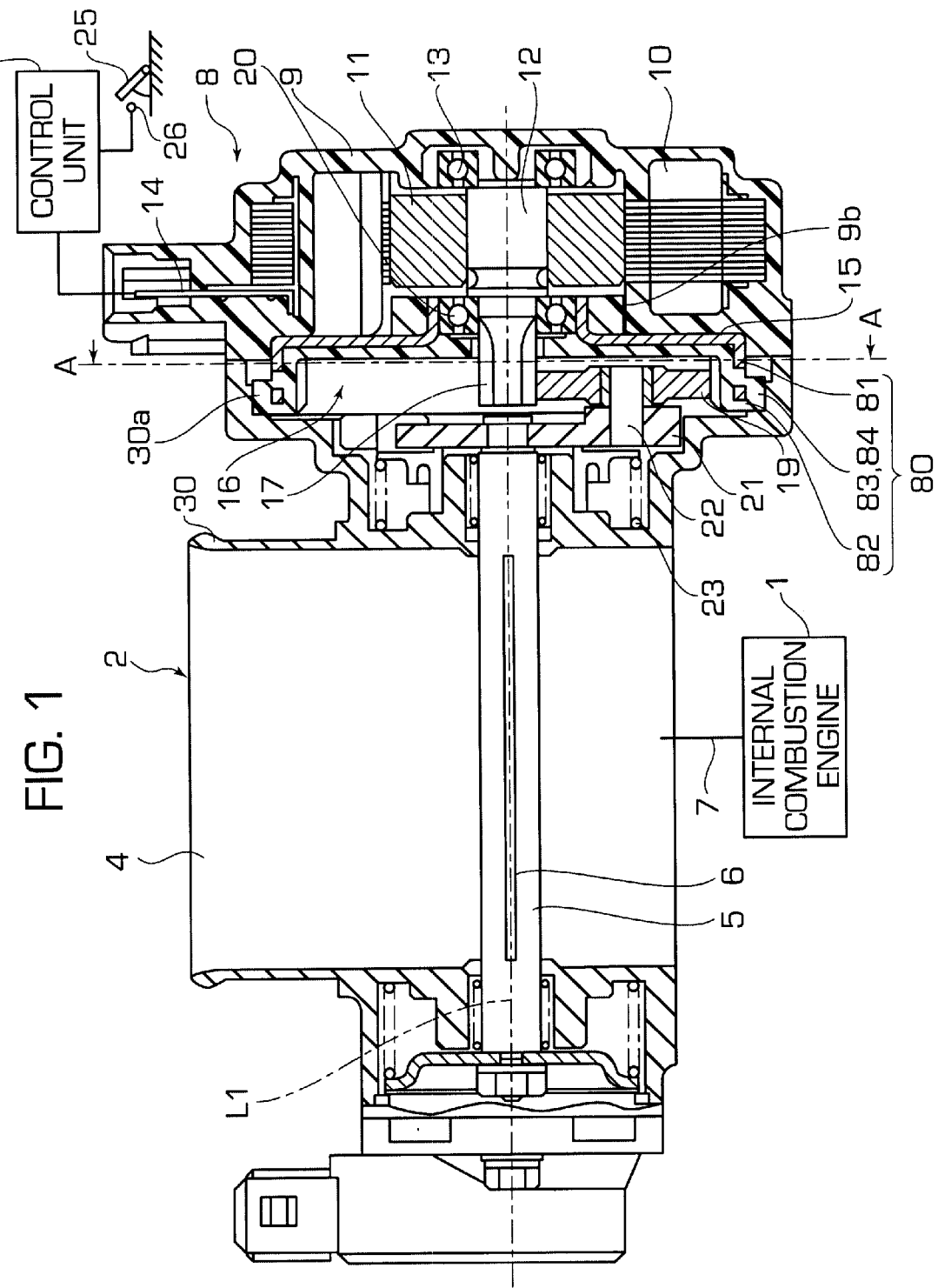
FIG. 1 is a side view showing partially cut away the throttle valve control device for an internal combustion engine according Embodiment 1 of the present invention.
Figure 2:
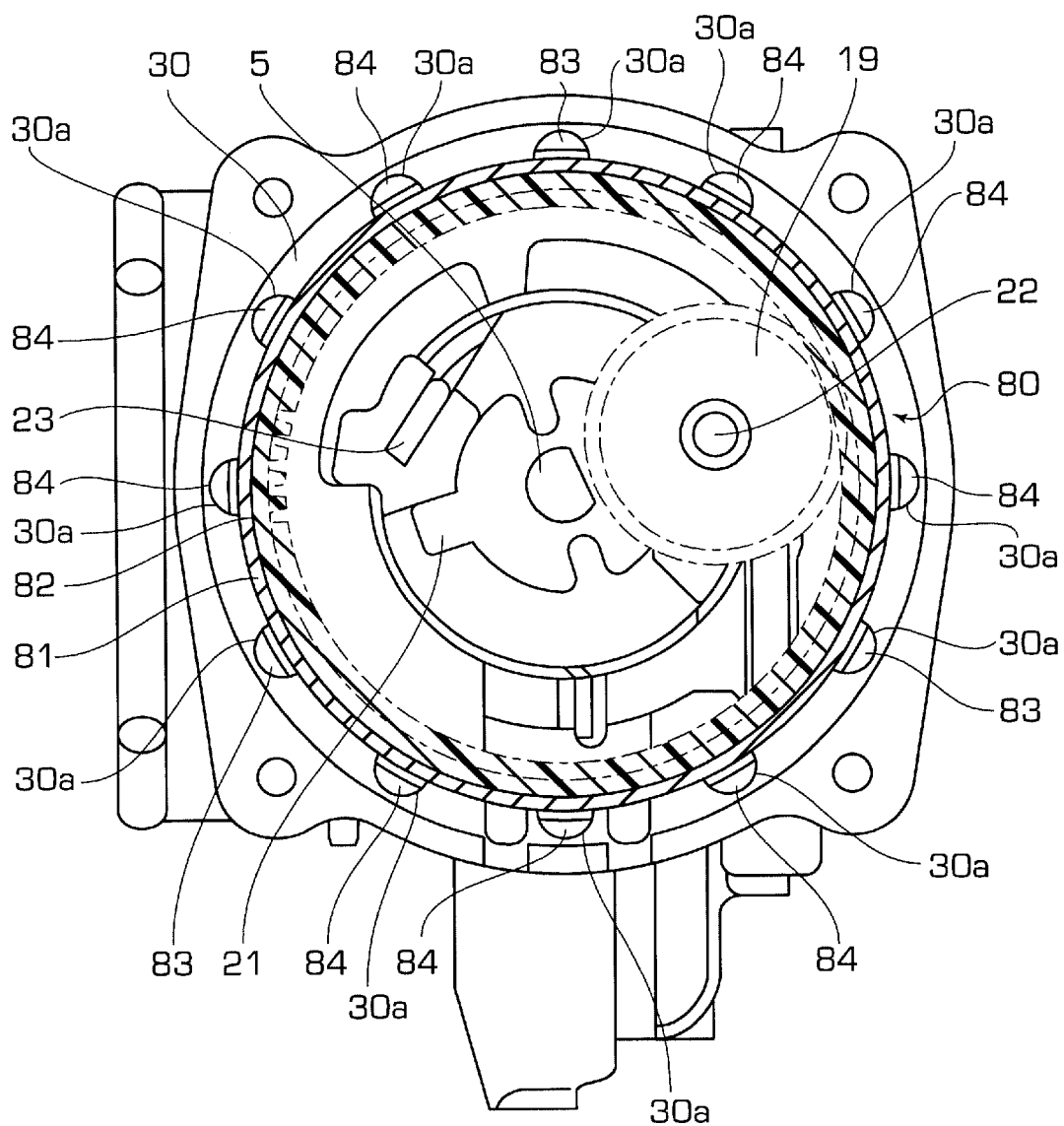
FIG. 2 is a sectional view of FIG. 1 along line A—A.
Figure 3:
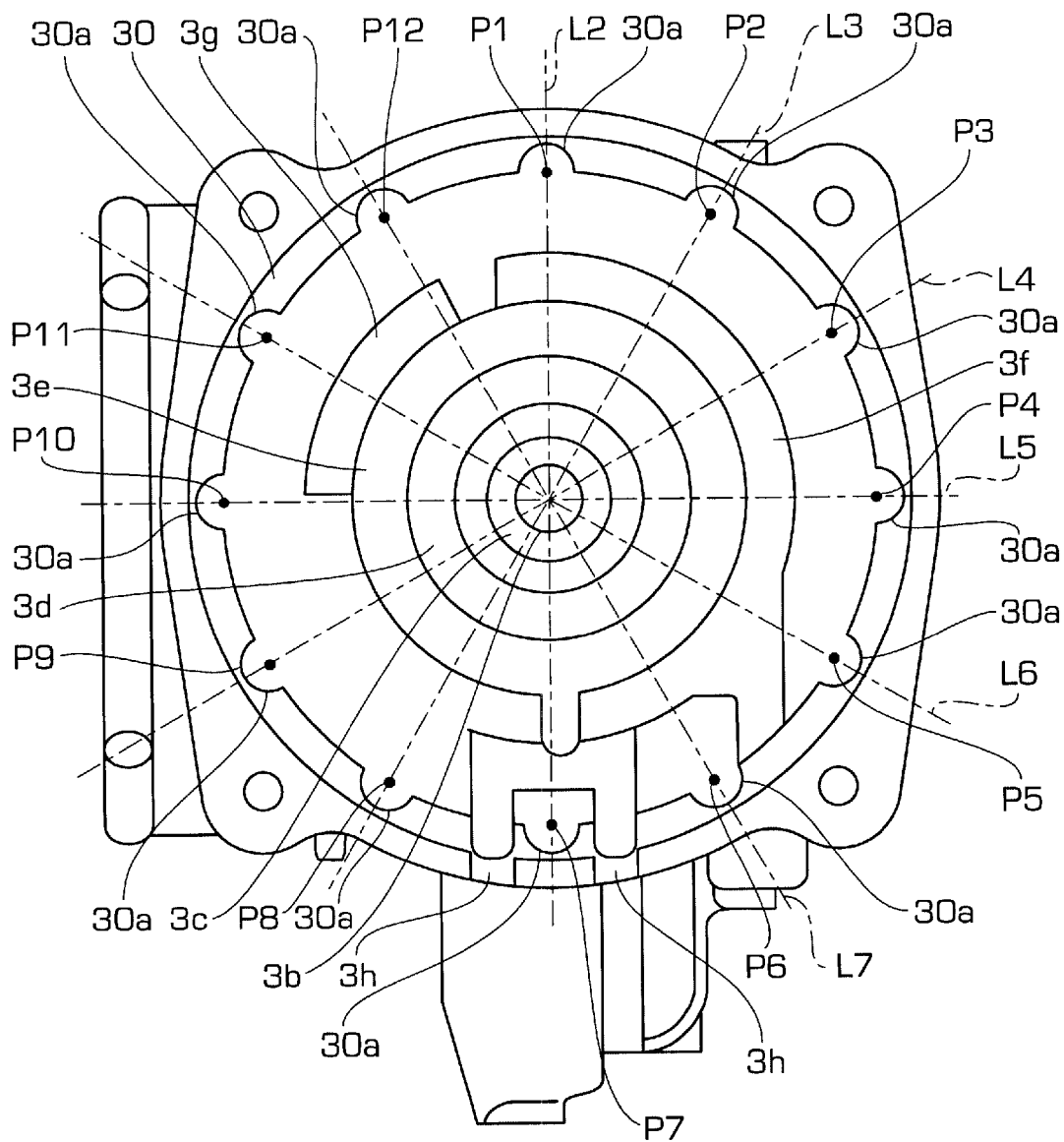
FIG. 3 is a front view of the valve housing according to the Embodiment 1 of the present invention.
Figure 4:
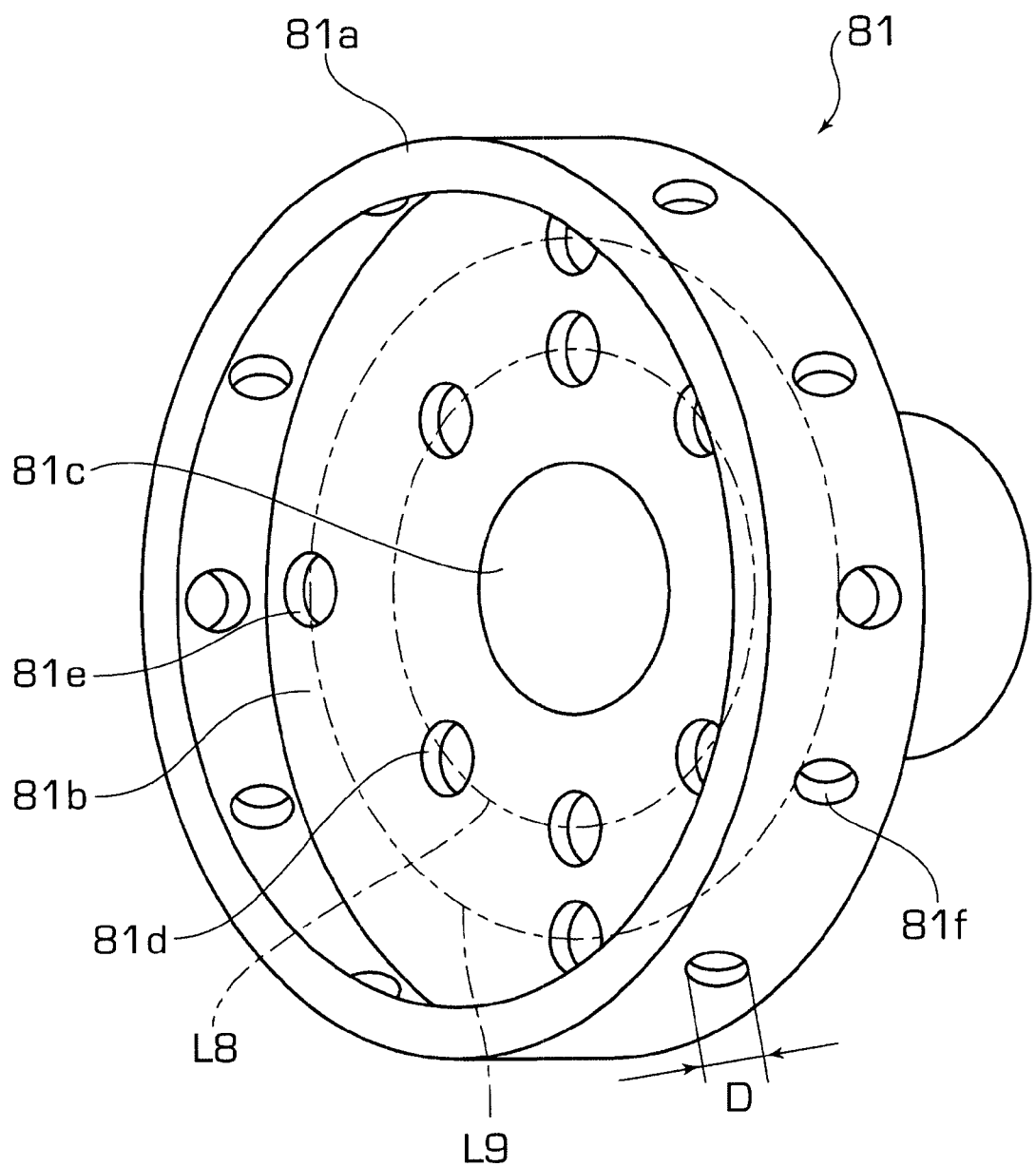
FIG. 4 is a perspective view of the center body according to the Embodiment 1 of the present invention.
Figure 5:
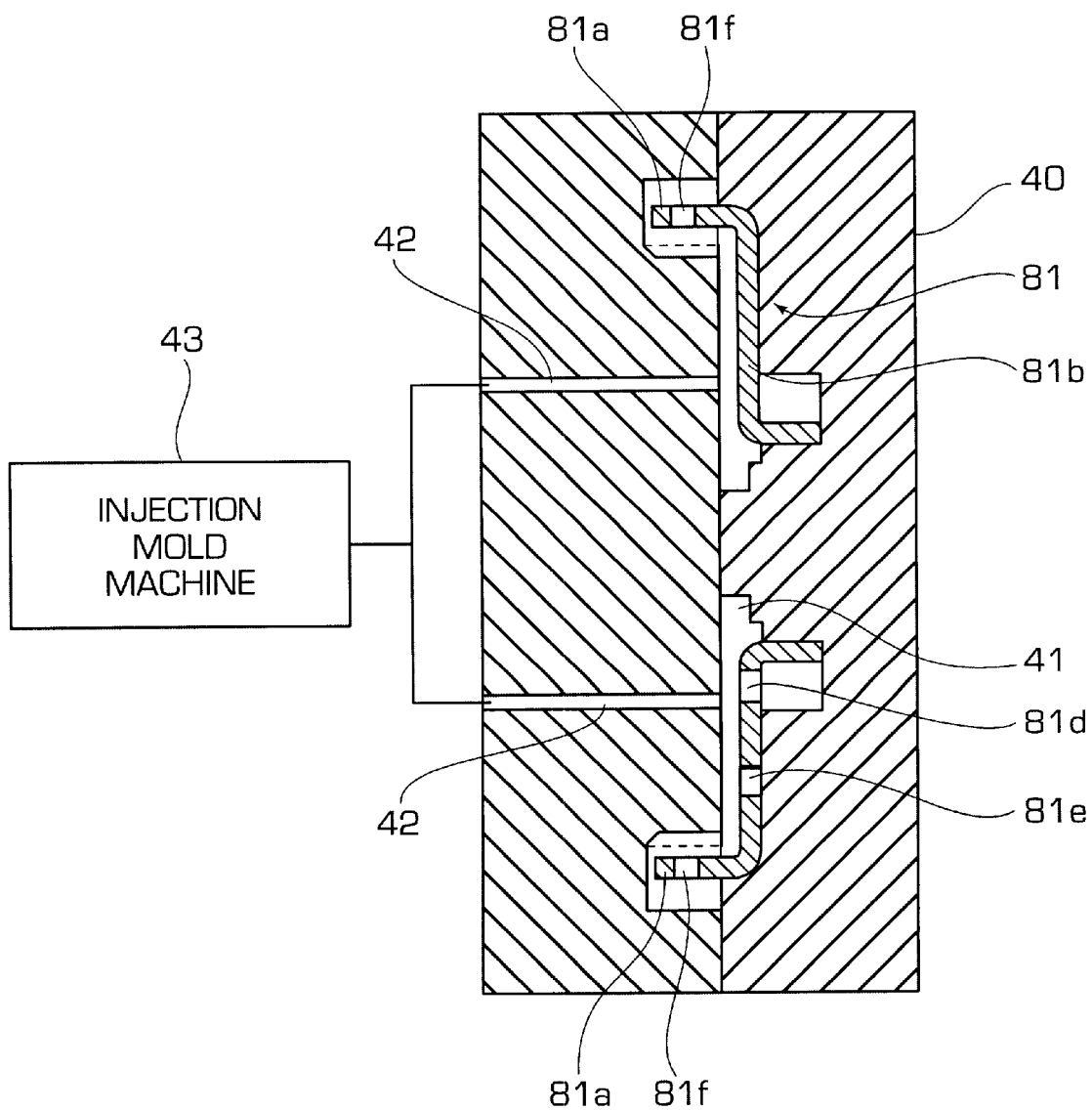
FIG. 5 is a sectional view showing a process of molding of the ring gear according to the Embodiment 1 of the present invention.
Figure 6:
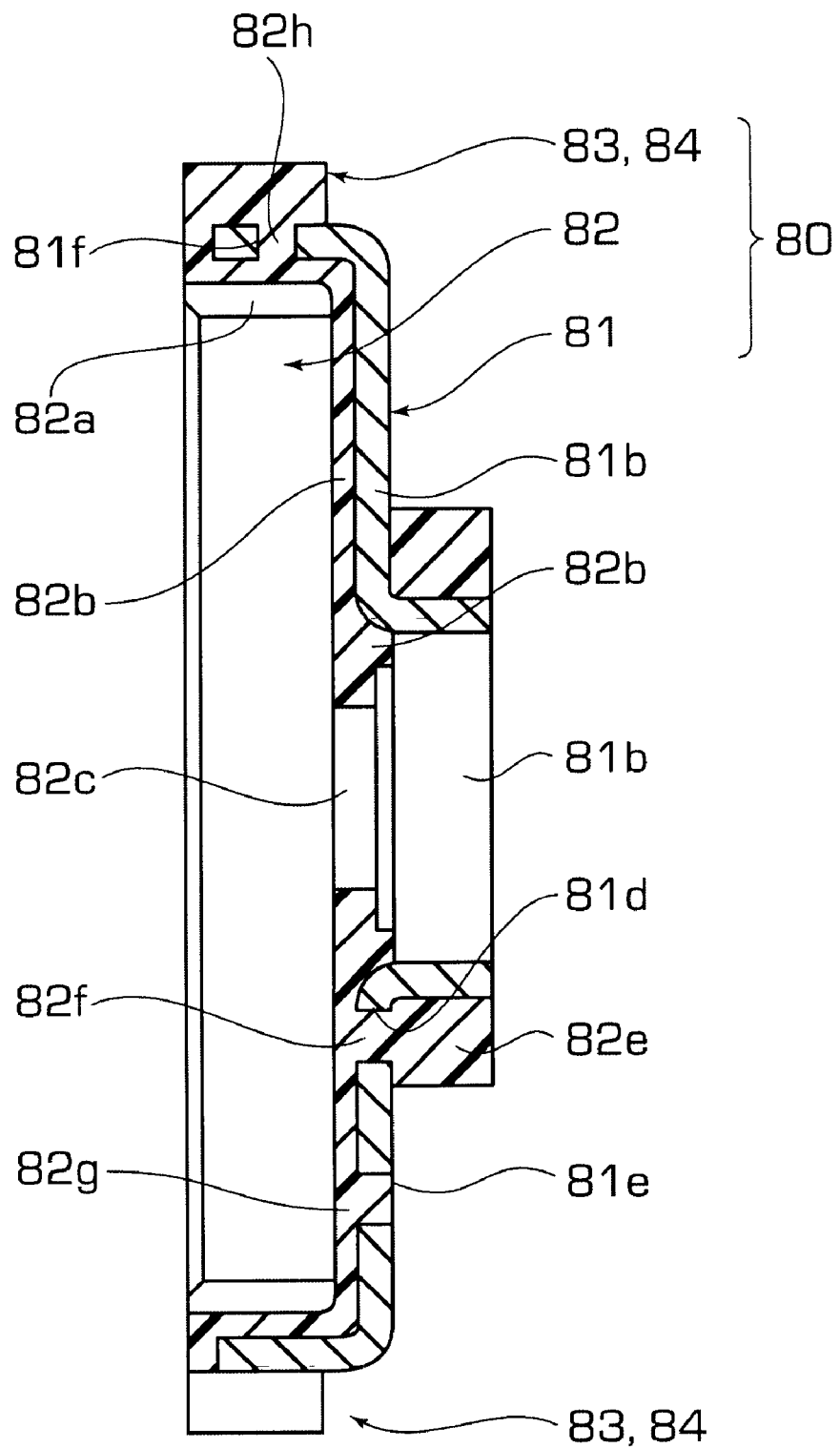
FIG. 6 is a sectional view of FIG. 7 along line B—B.
Figure 7:
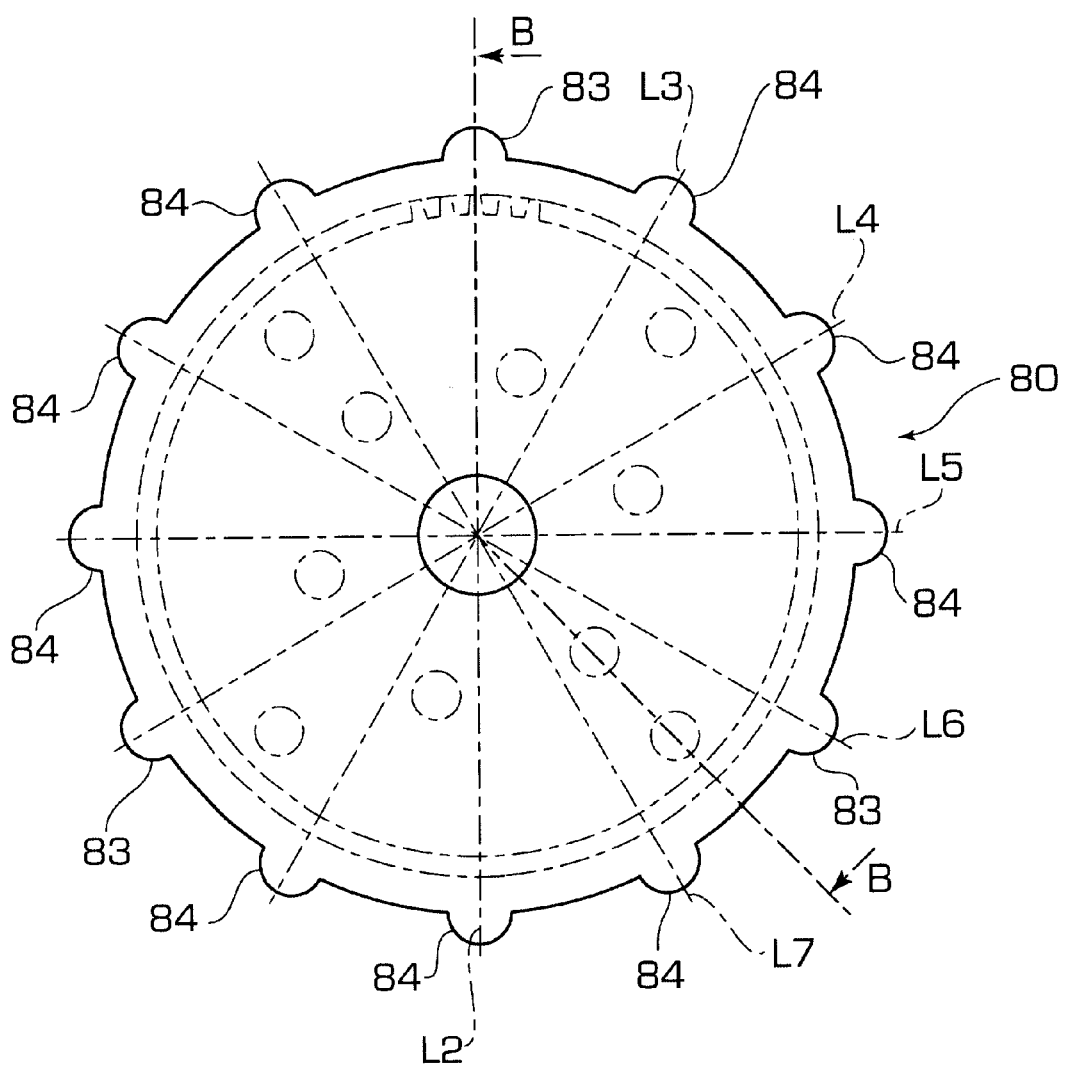
FIG. 7 is a front view of the ring gear according to the Embodiment 1 of the present invention.
Figure 8:
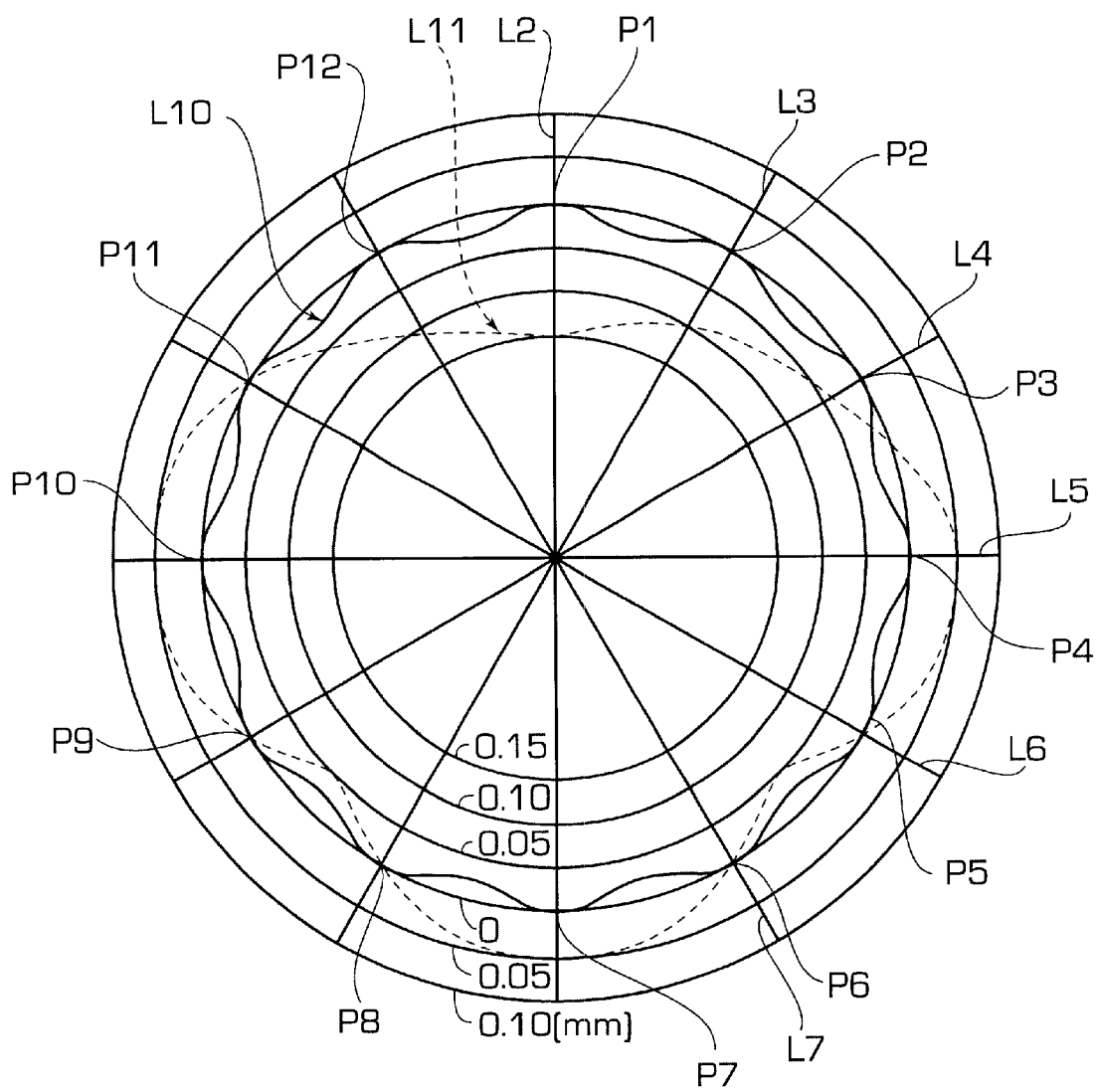
FIG. 8 shows a result of a measurement of circularity of the teeth portion according to the Embodiment 1 of the present invention.

FIG. 1 to FIG. 8 show a preferred Embodiment 1 of the present invention; FIG. 1 is a side view showing partially cut away the throttle valve control device for an internal combustion engine, FIG. 2 is a sectional view of FIG. 1 along line A—A, FIG. 3 is a front view of the valve housing, FIG. 4 is a perspective view of the center body 81 corresponding to the aforementioned center body 181, FIG. 5 is a sectional view showing a process of molding the ring gear 80 corresponding to the aforementioned ring gear 18, FIG. 6 is a sectional view of FIG. 7 along line B—B, FIG. 7 is a front view of the ring gear 80 and FIG. 8 show a result of a measurement of circularity of the teeth portion 82.

Figure 16:
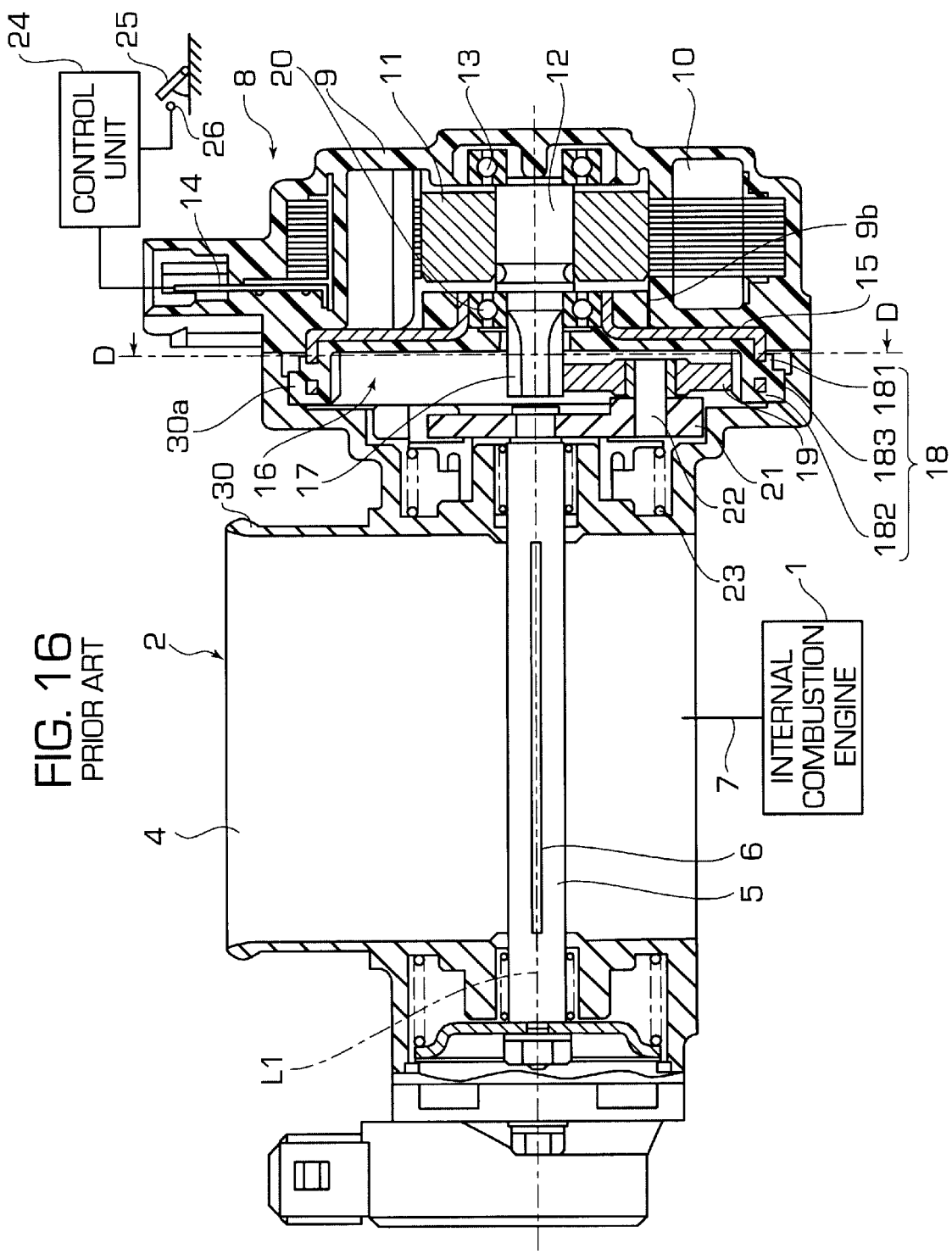
FIG. 16 is side view showing partially cut away a conventional throttle valve control device for an internal combustion engine.
Figure 17:
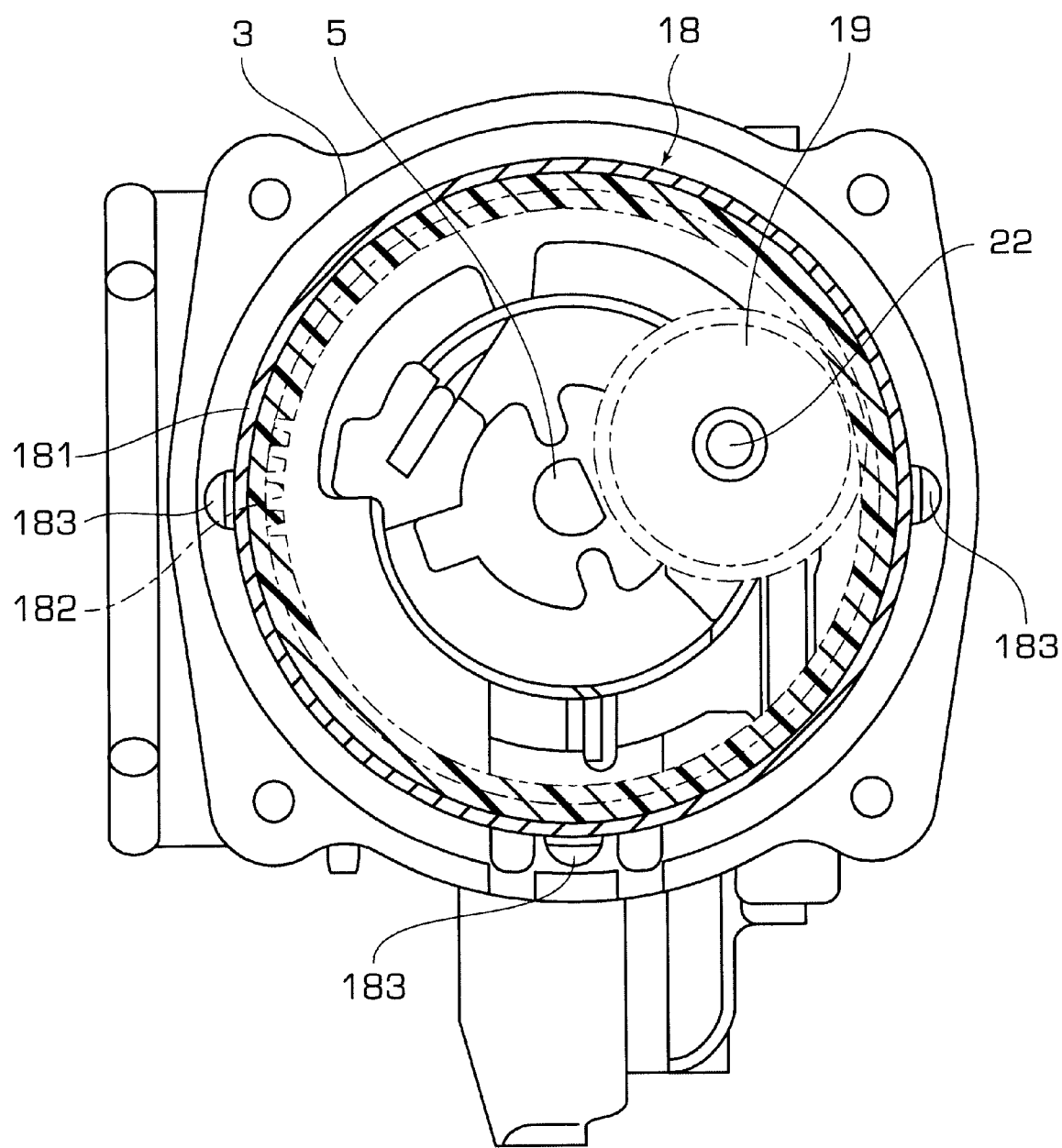
FIG. 17 is a sectional view of FIG. 16 along line D—D.

In FIG. 1, according to the Embodiment 1 the valve housing 30 comprises a plurality of engagement portions 30a; the ring gear 80 comprises the center body 81 having a rigidity, a teeth portion 82 made of a synthetic resin molded with respect to the center body 81 through a die, one or more of rotation detent portion 83 made of a synthetic resin formed with respect to the center body 81 through a die molding and one or more of contraction detent portion 84 made of a synthetic resin formed with respect to the center body 81 through a die molding and those of which are integrated to a single body; and the arrangement as above is characterized in that when the valve housing 30 and the ring gear 80 are combined, the rotation detent portions 83 and the contraction detent portions 84 are stored in the engagement portions 30a with fitting to them. Elements other than those mentioned above such as the internal combustion engine 1, throttle valve 2, intake air passage 4, valve shaft 5, valve body 6, intake air pipe 7, motor 8, motor housing 9, stator 10, rotor 11, output shaft 12, bearing 13, terminal 14, inner space 15, sun gear 17 and planetary gear 19 in the gear train unit 16, bearing 20, support member 21, support rod 22, spring 23, control unit 24, accelerator pedal 25, and accelerator sensor 26 are the same as shown by FIG. 16.

In FIG. 2, according to the Embodiment 1, a plurality of rotation detent portions 83 and a plurality of contraction detent portions 84 are formed in the same configuration. Total of twelve pieces of those rotation detent portions 83 and contract detent portions 84 are arranged and they protrude from outer periphery of the ring gear 80 at positions of dividing the outer peripheral surface of the ring gear 80 to an equal twelfth part along the peripheral direction; and the rotation detent portions 83 and the contraction detent portion 84 are stored in and fitting to the groove shaped engagement portion 30a formed on the peripheral wall of valve housing 30. As a result, the rotation detent portions 83 simultaneously assumes the contraction detent function and likewise the contraction detent portions 84 simultaneously assumes the rotation detent function and thus the rotation detent portions 83 and the contraction detent portions 84 share the contraction detent function and the rotation detent function, respectively. Then, the case where three pieces of rotation detent portions 83 and nine peaces of contraction detent portions 84 are arranged with angular spacing of 120 degrees and 30 degrees, respectively is shown as an example but the member of those portions to be used is not limited to this example. For instance, in order to prevent the rotation of the ring gear 80, the number of rotation detent portion 83 to be required in view of the strength may be one or more than two. And in view of improvement of accuracy of the circularity of the teeth portion 82, the number of contraction detent portion 84 may be one or more than two. And as the total number of them increases, the accuracy for preventing the rotation of the ring gear 80 and also the accuracy of the circularity of tooth portion 82 are improved. When one piece for each of the rotation detent portion 83 and the contact detent portion 84 is used, the rotation detent portion 83 and the contraction detent portion 84 are arranged symmetrically with respect to the valve shaft 5. When the total number of three pieces of the rotation detent portions 83 and the contraction detent portions are used, they are arranged with an angular spacing of 120 degrees.

Figure 18:
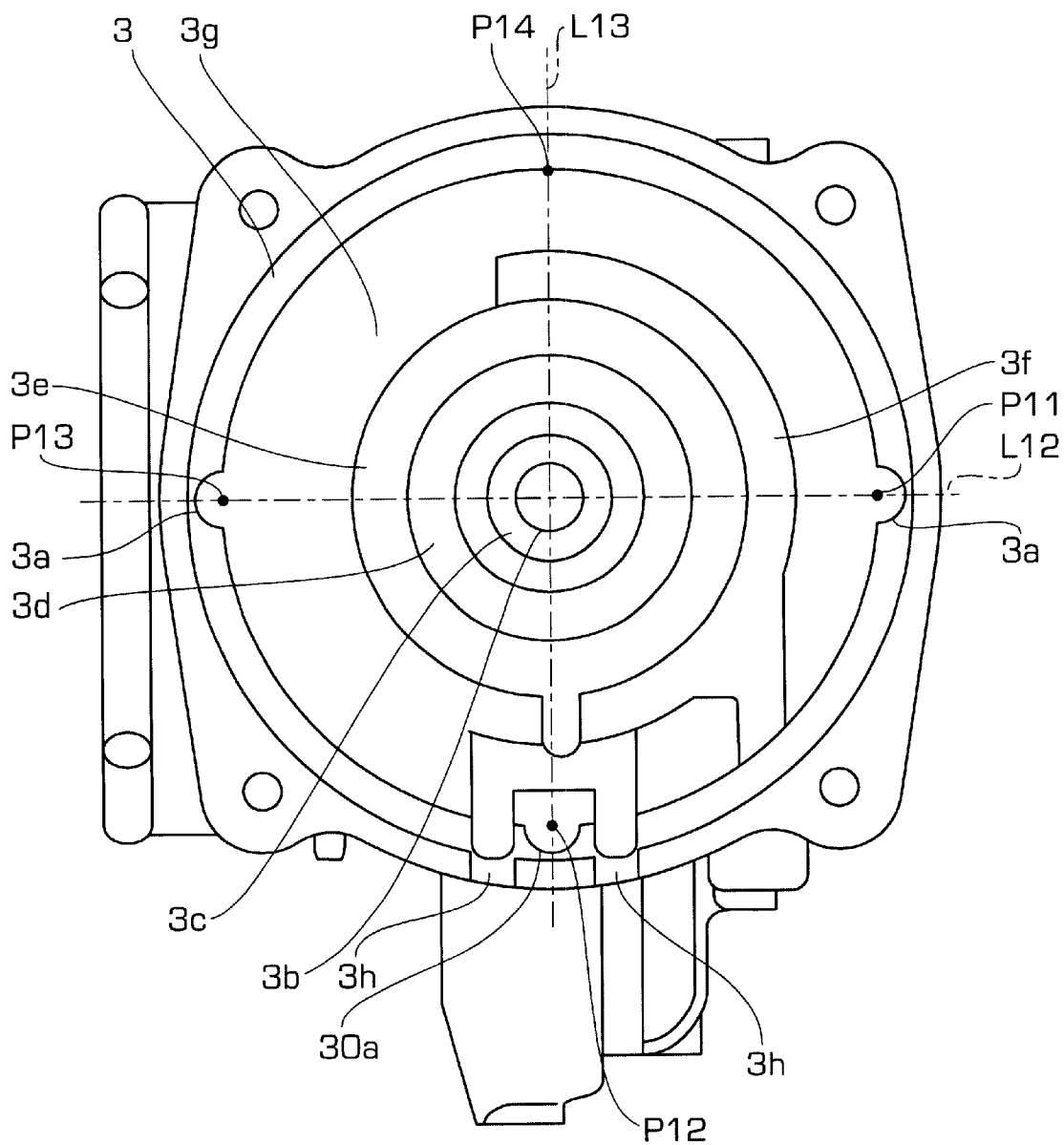
FIG. 18 is a front view of a conventional valve housing.
Figure 19:
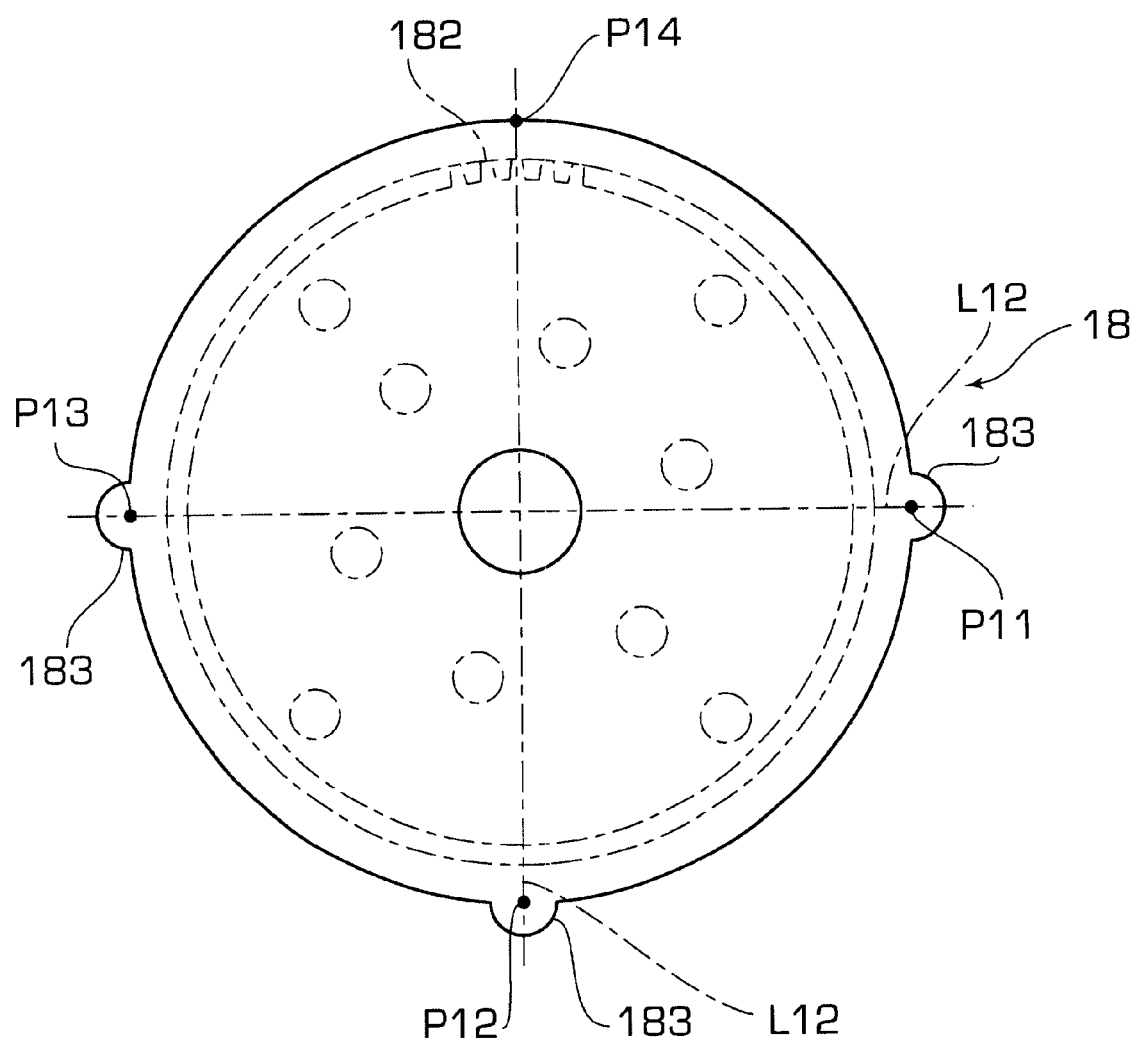
FIG. 19 is a front view of a conventional ring gear.

In FIG. 3, the valve housing 30 comprises groove shaped engagement portions 30a on an inner peripheral surface which forms the inner space 15 as shown by FIG. 1. These engagement portions 30a are arranged at positions of intersections of the inner peripheral surface of the valve housing 30 with six straight linens of L1, L2, L3, L4, L5 and L6, which pass through center of the valve housing 30 and are mutually spaced by 30 degrees, namely points of P1, P2, P3, P4, P5, P6, P7, P8, P9, P10, P11 and P12. Those elements other than the engagement portions 30a such as the valve shaft through hole 3b, the bearing storing recessed portion 3c, the spring guide arrangement portion 3d, the spring storing recessed portion 3e, the support member clearance groove 3f, the spring guide stopper clearance groove 3g and the air hole 3h are the same with those shown by FIG. 18.

As shown by FIG. 4, the center body 81 is formed in such a manner that by drawing a metal plate material the center hole 81c is swelled out toward back face side at the center of the dish shaped base portion 81b having the peripheral wall 81a. On base portions 81b a plurality of through holes 81d and 81e are formed along peripheral direction with an equidistance on circumferences of $L_8$ and $L_9$ as shown by chain lines of two concentric circles having different radii and being coaxial with the center hole 81c. On the peripheral wall 81a, the through hole 81f are formed with equidistance along the peripheral direction by the number which is same with the total number of the rotation detent portions 83 and the contraction detent portions 84.

Referring to FIG. 5, description on the insert molding of the ring gear 80 using the center body 81 as an insert member will be given. After the center body 81 formed as shown by FIG. 4 is stored in the molding space 41 of the molding die 40 consisting of split dies, the molding die 40 is closed. Then the molten synthetic resin from the injection mold machine 43 are filled and solidified in the molding space 41 enclosing the insert body 81 through the inlet hole 42 formed in the molding die 40, and thereafter the molding die 40 is opened. Under this condition, the molding article corresponding to the ring gear 80 formed to a single body of the center body 81 and the teeth portion 82 as shown by FIG. 6 is released from the molding die 40. In FIG. 5, to give a clear illustration, the synthetic resin to be filled and solidified in the molding space 41 is omitted from the drawing.

As shown in FIG. 6 too, the synthetic resin portion of the ring gear 80 comprises the teeth portion 82a, the face portion 82c, the through hole portion 82c, the inner peripheral annular protrusion portion 82d, the engagement portion 82e, the bridge portion 82f, the filling portion 82g, the bridge portion 82h, a plurality of rotation detent portions 83, and a plurality of contraction detent portions 84. The inner teeth portion 82a is formed along the inner periphery of the outer wall 81a of the center body 81; the inner face portion 82b is extended keeping contact with the front face of the base portion 81b of the center body 81; the through hole portion 82c is formed to make a clearance away from the sun gear 17 at the center portion of the face portion 82b; the inner peripheral annular protrusion 82d protrudes annularly on the back face of the through hole portion 82c around the joint portion of the base portion 81b of the center body 81 and the center hole portion 81c so that the inner peripheral annular protrusion 82d contacts with the outer ring of the bearing 20; the engagement portion 82e is formed annularly keeping contact with the outer peripheral surface of the center hole position 81c of the center body 81 and the back face of the base portion 81b surrounding that outer peripheral portion; the bridge portions 82f is filled and solidified in the through hole 81d of the center body 81 and connects the face portion 82b and the engagement portion 82e; the filling portion 82g swells out from the face portion 82b and filled and solidified in the through hole 81e of the center body 81. And also as shown by FIG. 7 too, the rotation detent portions 83 and the contraction detent portions 84 are positioned on the outer peripheral surface 81a of the center body 81 with equidistance.

With reference to FIG. 1, a description will be give of works for installing the gear train unit 16 consisting of the sun gear 80, the ring gear 80 and the planetarly gear 19 into the inner space 15 to be formed with hermetical sealed by the valve housing 30 and the motor housing 9, when the throttle valve 2 and the motor 8 are formed separately and after that they are arranged with mutual abutment. First, under the condition that the sun gear 17 is placed coaxially with and on the outer periphery of the output shaft 12 which projects from the motor housing 9 to the opening of the motor housing 9, the center hole portion 81c of the ring gear 80 (see FIG. 6) is engaged circumscribably with the bearing 20 which is circumscribably engaged with the output shaft 12 positioned in the vicinity of the sun gear 17; the inner peripheral annular protrusion 82a (see FIG. 6) of the ring gear 80 is put into contact with the annular end face of the outer ring of the sun gear 17; the outer peripheral surface of the peripheral wall 81a of the ring gear 80 (see FIG. 4) is inscribably engaged with the inner peripheral surface of the opening of the motor housing 9; and a part of the outer peripheral surface of the engagement portion 82c of the ring gear 80 is made contact with the hole wall of the storing portion which stores rotatably the rotor 11 of the motor housing 9. The sun gear 17, which is formed separately from the output shaft 12, may be attached to the shaft 12 by engagement with that shaft 12 or alternatively the teeth of the sun gear may be cut on the peripheral surface of the output shaft 12. Concurrently with this process, the planetary gear 19 is attached to the valve shaft 5 which projects from the valve housing to the opening of the valve housing through the supporting member 21 and the supporting rod 22. In this condition, worker adjusts position of the valve body 6 by rotating the valve shaft 5 so that the valve body 6 is placed at either of a position for minimizing the sectional area of the intake air passage 4 or a position for maximizing that area.

Next, the opening of the valve housing 30 and opening of the housing 9 are butt jointed together so that the inner space 15 is formed. In this instance, the planetary gear 19 is mated to both of the sun gear 17 and the ring gear 80 while the gear 19 is being inserted between the sun gear 17 and the ring gear 80. In parallel with this work, under the condition that the inner peripheral surface 3a of the valve hosing 30 and the peripheral surface of the opening of the ring gear 80 make a mutual contact, the valve housing 30 is engaged to fit to the peripheral wall 81a of the ring gear 80; and the opening end face of the valve housing 30 is butt jointed to the opening end face of the motor housing 9. By virtue of this arrangement, the valve housing 30 and the motor housing 9 are brought into the condition that they are fixed to be prevented from moving along the radial direction of the valve shaft 5 and that of the output shaft 12 through the ring gear 80, and the center of rotation and that of the output shaft 12 are positioned coaxially on a single straight line $L_1$ shown by the chain with a single dot line and they are placed to face each other with a gap there between. Furthermore the inner space 15 is formed with hermetically sealed and into this space 15 the gear train unit 16 is installed.

When the valve housing 30 and the ring gear 80 are combined, the rotation detent portion 83 and the contraction detent portions 84 of the ring gear 80 are stored with fitting to the engagement portion 30a. By this arrangement, the ring gear 80 is regulated with respect to the rotation of peripheral direction; in other words, the ring gear 80 is fixed with respect to the valve housing 30 and the motor housing 9. In this way, after the gear train unit 16 is installed into the inner space 15, the valve housing 30 and the motor housing 9 are joined by means of unshown securing means such as bolts and brought into the condition as shown by FIG. 1.

According to the Embodiment 1, since a plurality of rotation detent portions 83 and a plurality contraction detent portions 84 are stored with fitting to the engagement portions 30a of the valve housing 30, the ring gear 80 can be properly fixed to the valve housing 30 and to the motor housing 9 and also the teeth portion 82 made of synthetic resin is supported at a plurality of spots uniformly by the center body 81, and thus the circularity of the teeth portion 82 is improved with respect to the center body 81. Measurement of this circularity was performed and the result as shown by the real line by FIG. 8 is obtained. According to the real line L10 of FIG. 8, result of the circularity of measurement, the values at the points of P1 to P12 are unchanged and values obtained between points of P1 to P12 deviates inwardly merely by about 0.025 mm; and comparing this result with the conventional one as shown by the dotted line, improvement on the accuracy of the circularity of the pitch circle can be acknowledged. With respect to this point, according to the Embodiment 1, the above improvement was attained by fixing the teeth portion 82 to the peripheral wall 81a of the center body 81 by adapting the arrangement such that the rotation detent portions 83 and the contraction detent portions 84 are sandwiched between the peripheral wall 81a of the center body 81 and the valve housing 30 at the positions of P1 to P12.

Also according to the structure of the Embodiment 1, at the ring gear 80, the inner teeth portion 82a and the rotation detent portions 83 or the contraction detent portions 84 are connected to the center body 81 through the bridge portion 82h which is filled and solidified in the through hole 81a being provided as a connection means of synthetic resin center body 81, and therefore the inner teeth portion 82a is firmly fixed to the center body 81 thereby the accuracy of the circularity of the teeth portion 82 is improved further. Since the face portion 82b, which lies next to the inner teeth portion 82a of the teeth portion 82 and is provided on the front face side of the center body 81, and the engagement portions 82e, which is provided on the back face side of the center body 81, are connected to the center body 81 through the bridge portion 82f which is filled and solidified in the through hole 81d being provided as a connecting means of the synthetic resin, the teeth portion 82 is firmly fixed to the center body 81. Also, since the filling portion 82g is filled and solidified in the through hole 81e as connection means of synthetic resin, which is provided separately from the above through hole 81d through the center body 81, from the face portion 82b of the teeth portion 82, the teeth portion 82 can be properly adapted to prevent from rotation with respect to the center body 81.

According to the structure of the Embodiment 1, by the means of the center hole portion 81c drawn from the center body 81 made of a metal, the ring gear 80 is arranged coaxially with the sun gear 17 through the output shaft 12 of the motor 8 and the bearing 20, the peripheral wall 81a drawn from the center body 81 engages inscribably to the inner peripheral surface of the opening of the motor housing 9, and valve housing 30 and the motor hosing 9 are butt jointed to from the inner space 15 under the state that the planetary gear 19 is attached to the valve shaft 5 of the throttle valve 2 through the support member 21 and the support rod 22; and thus the planetary gear 19 mates with the sun gear 17 and the ring gear 18, the center of the rotation of the valve shaft 5 and that of the sun gear 17 are properly arranged facing each other to the be coaxial with a predetermined interval, the valve housing 30 and the motor housing 9 are properly fixed through the peripheral wall 81a drawn from the center body 81, and the center hole portion 81c of the center body 81 is arranged to be properly connected to the motor housing 9 through engagement portion 82e consisting of the synthetic resin of the ring gear 80. As a result, when the throttle valve device for an internal combustion engine 1 comprising the throttle valve 2, the motor 8 and the gear train unit 16 is installed on an automobile and even in the case where a vibrational motion is inputted to the throttle valve control unit, the throttle valve 2, the motor 8 and the gear train unit 16 can not be shaked individually and separately and thus the rotation of the output shaft 12 of the motor 8 can be properly transmitted to the valve shaft 5 by means of the gear train unit 16.

Embodiment 2

Figure 9:
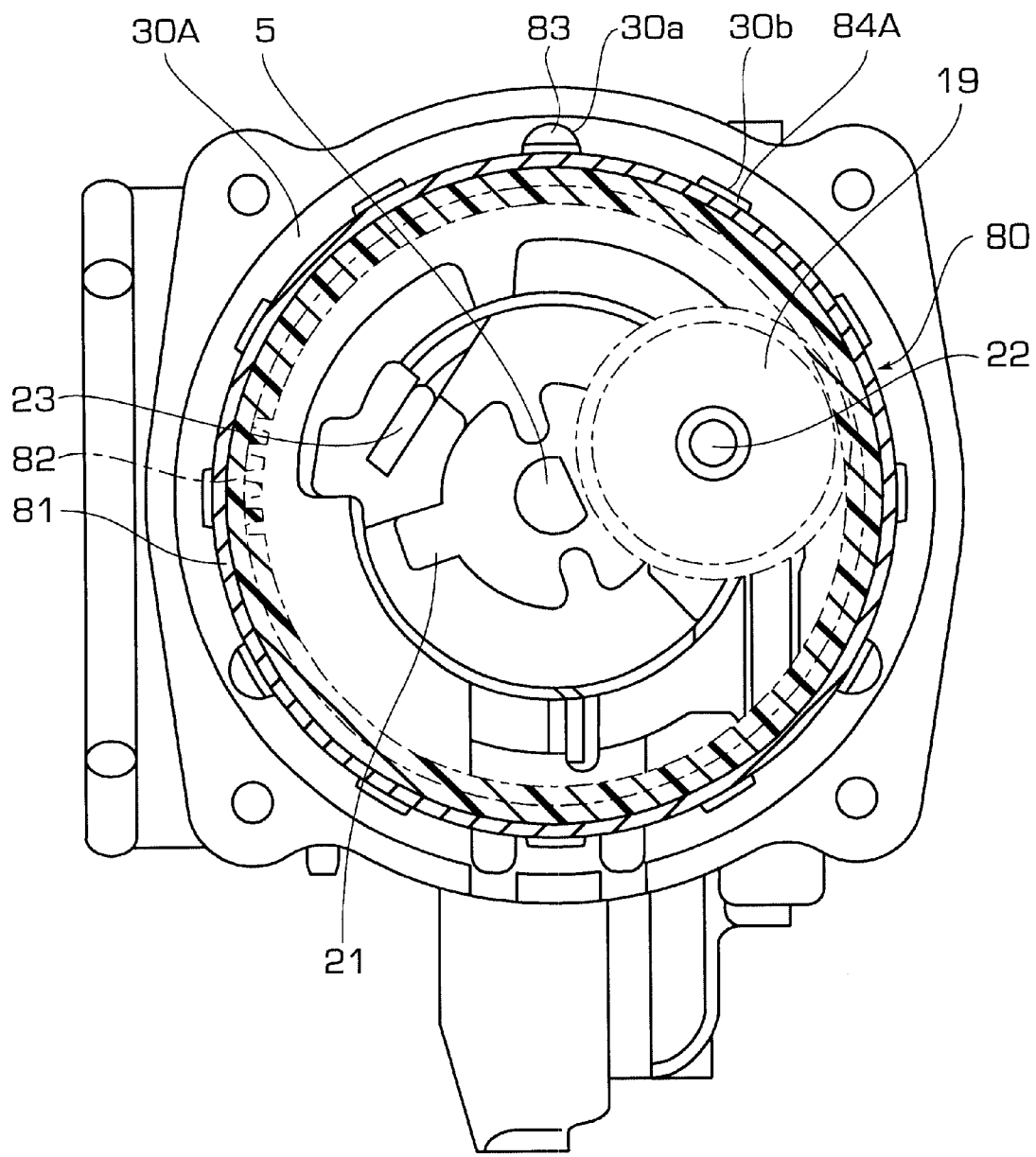
FIG. 9 is a sectional view of the throttle valve control device of an internal combustion engine according to the Embodiment b2 of the present invention.
Figure 10:
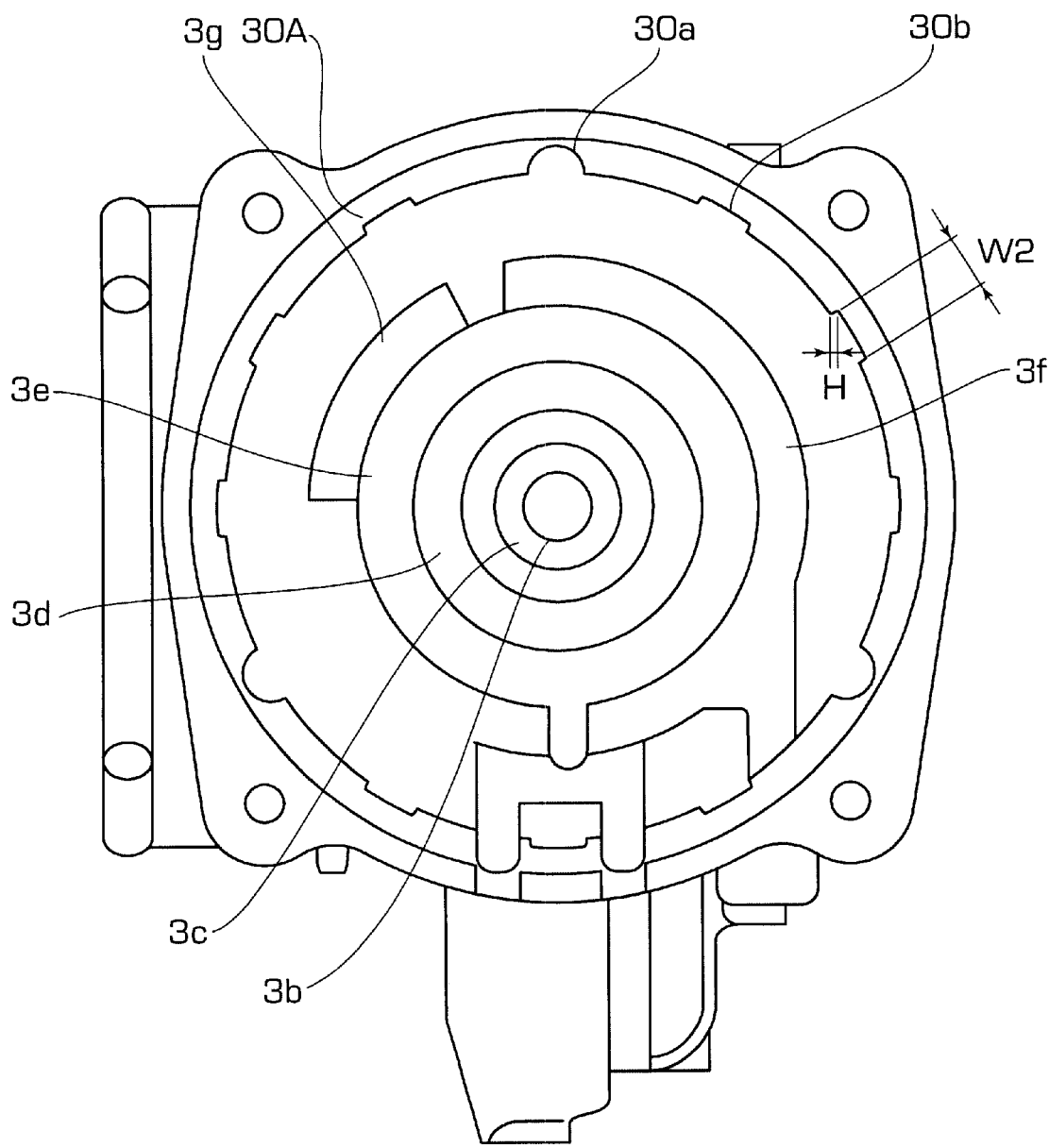
FIG. 10 is a front view of the valve housing according to the Embodiment 2 of the present invention.
Figure 11:
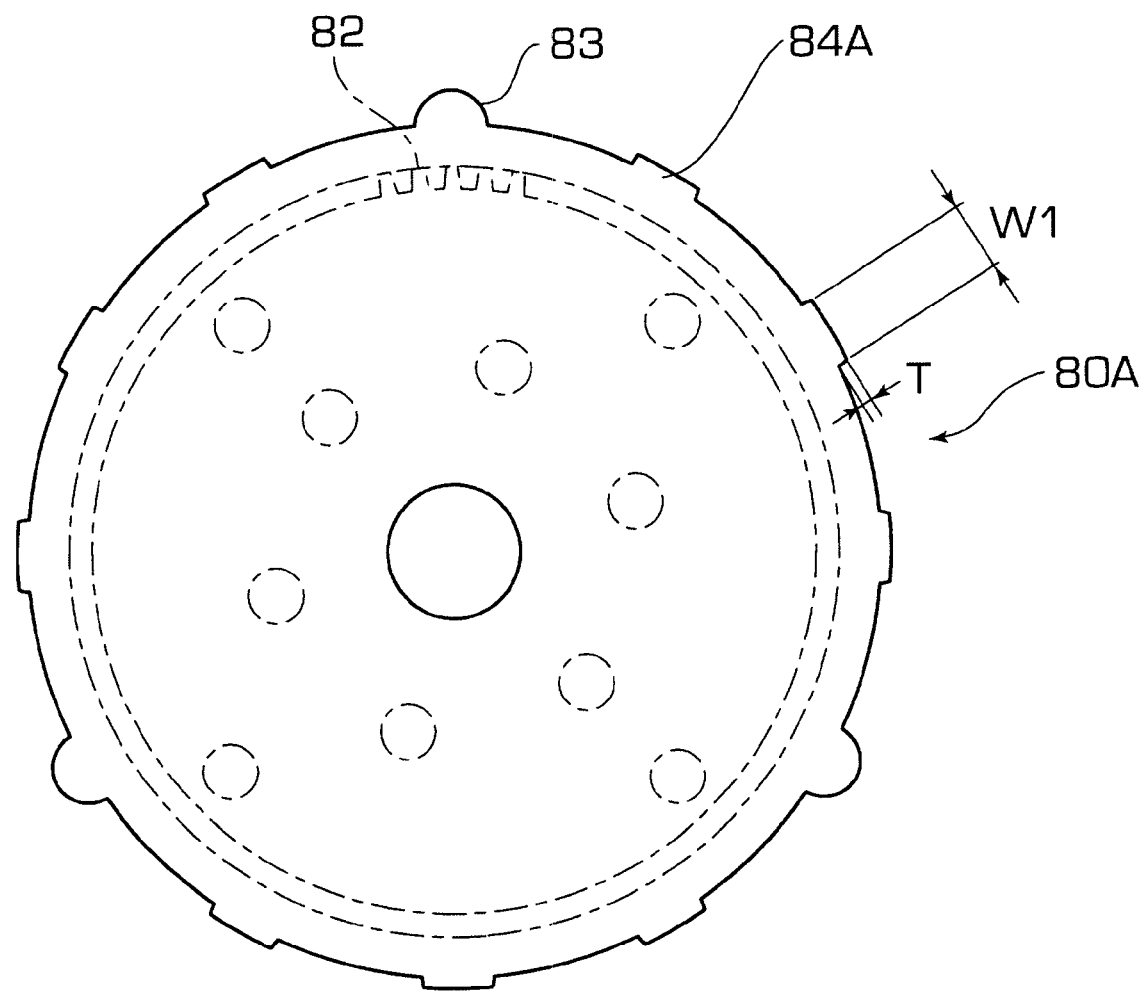
FIG. 11 is a front view of the ring gear according to the Embodiment 2 of the present invention.

FIG. 9–11 illustrate the Embodiment 2 of the present invention: FIG. 9 is a sectional view corresponding to the aforementioned FIG. 2, FIG. 10 is a front view of the valve housing 30A corresponding to the aforementioned valve housing 30 and FIG. 11 is a front view of the ring gear 80A corresponding to the aforementioned ring gear 80. According to this embodiment 2, the contraction detent portion 8A corresponding to the aforementioned contraction detent portion 84 is formed to be a minimum size to be capable of flowing of the synthetic resin material into the molding die. In other words, the width W1 of the contraction detent portion 84 as shown by FIG. 11 is formed to be larger a little than the diameter D of the through hole 81f of the center body 81 as shown by FIG. 4 and the thickness T of the contraction detent portion 84A is formed to have a small thickness. Also, width W2 of the clearance groove 30b for the contraction detent 84A and the depth H of the clearance groove 30b is formed to be larger a little than thickness H of the contraction detent 84A (W1>D, W2>W1, H>T). As a result, amount of the material of the synthetic resin for forming the contraction detent portion 84 can be reduced and a cost reduction can be attained.

Embodiment 3

Figure 12:
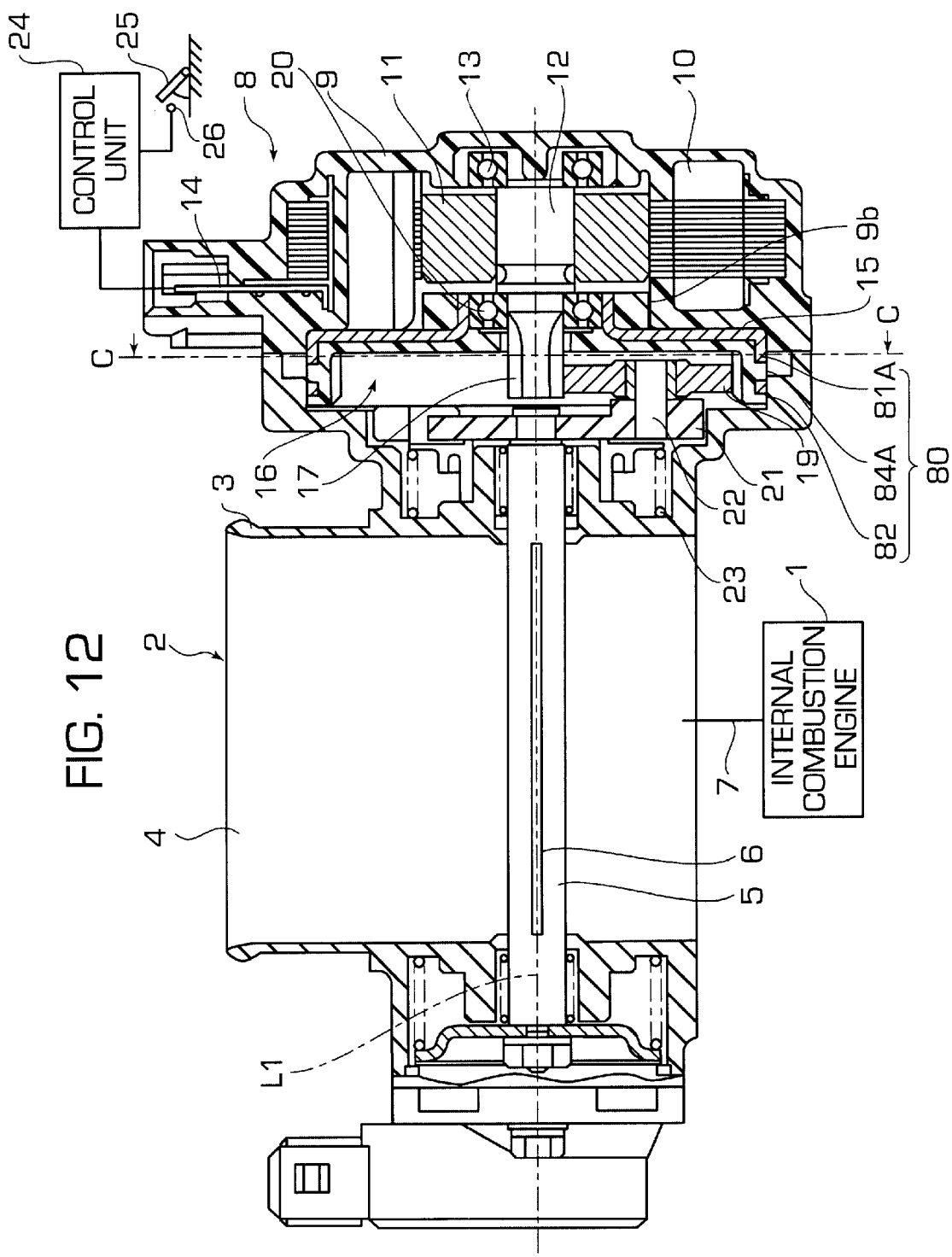
FIG. 12 is a side view partially cut away the throttle valve control device for an internal combustion engine according to the Embodiment 3 of the present invention.
Figure 13:
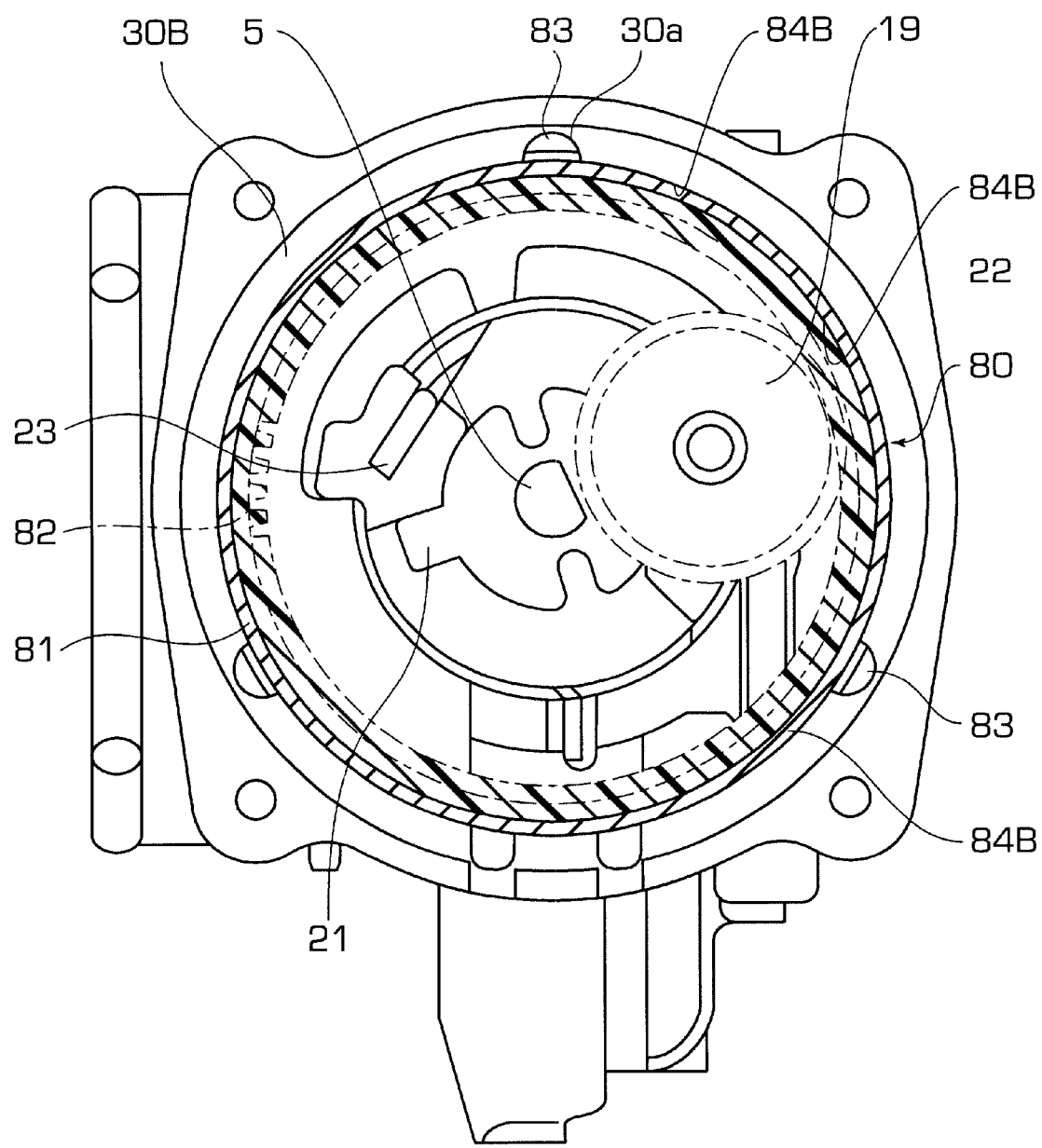
FIG. 13 is a sectional view of FIG. 12 along line C—C.
Figure 14:
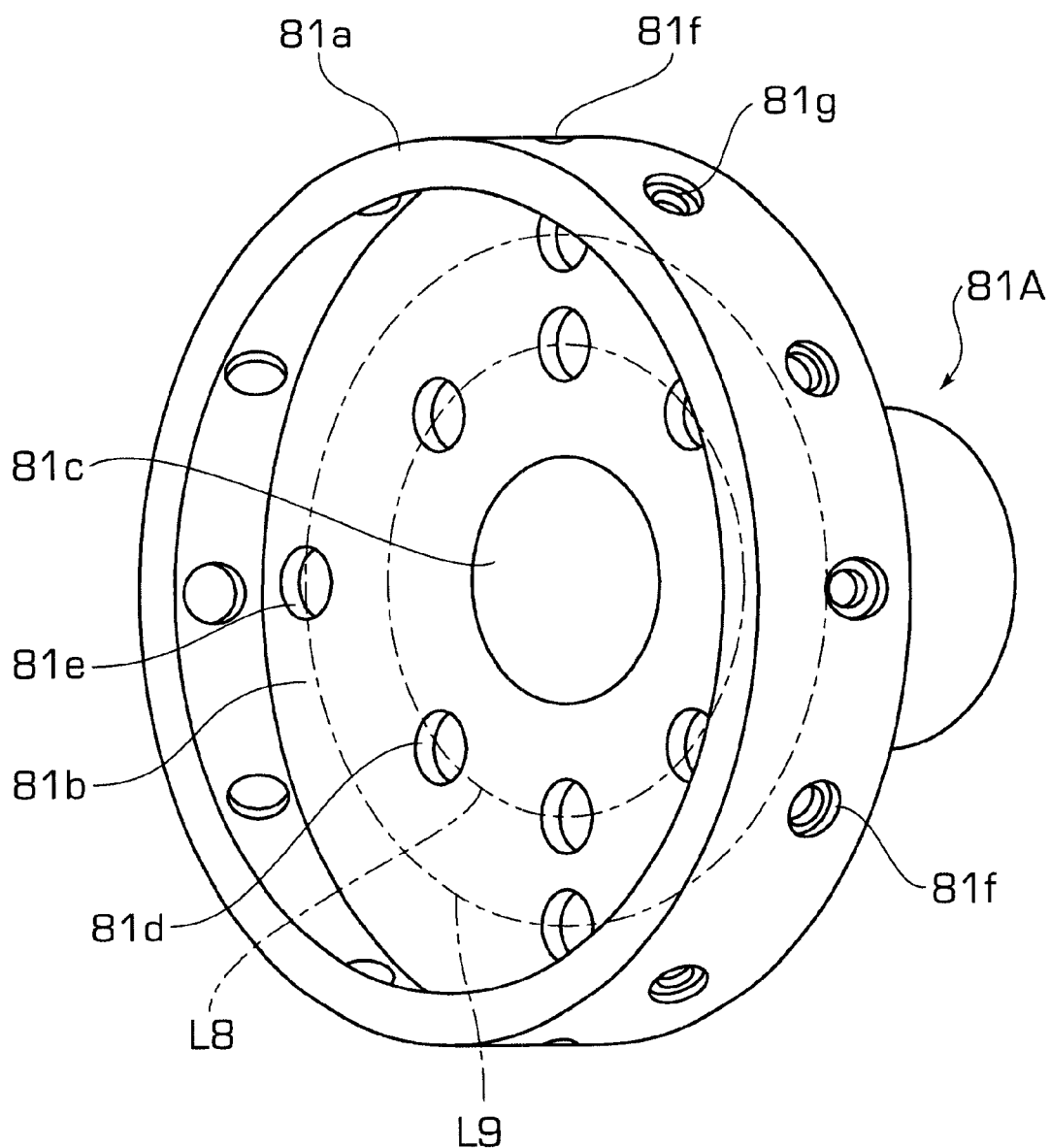
FIG. 14 is a perspective view of the center body according to the Embodiment 3 of the present invention.
Figure 15:
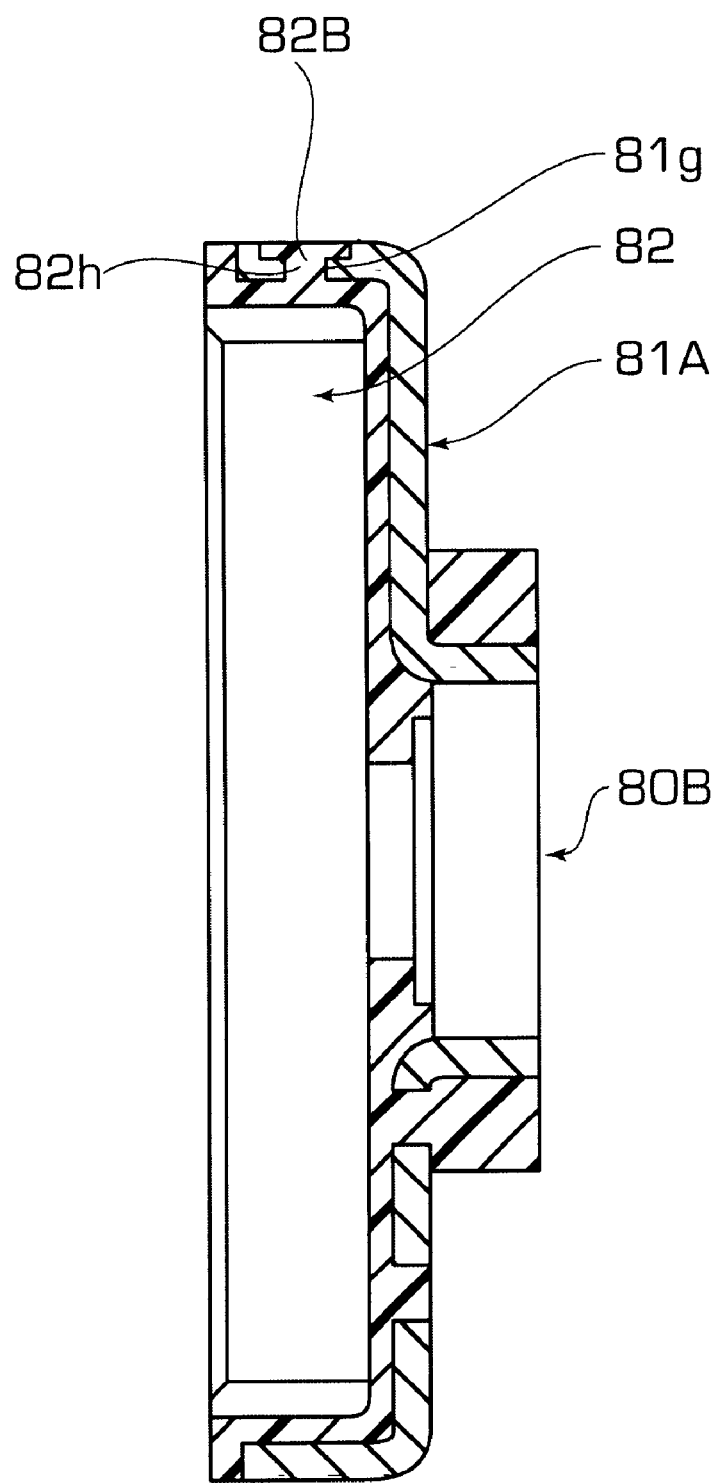
FIG. 15 is a sectional view of the ring gear according to the Embodiment 3 of the present invention.

FIG. 12–15 illustrate the Embodiment 3 of the present invention: FIG. 12 is a side view corresponding to the aforementioned FIG. 1, FIG. 13 is a sectional view along line C—C of FIG. 12, FIG. 14 is a perspective view of the center body 81A corresponding to the aforementioned center body 81, and FIG. 15 is a sectional view of the ring gear 80B corresponding to the one 80A as above corresponding to FIG. 6. According to this Embodiment 3, the contraction detent portion 84B corresponding to the ring gear 84A as above is fixed inside of the center body 81A. In other words, as shown by FIG. 14 through the peripheral wall 81a of the center body 81A, contraction detent holes are formed in the form of stepped holes 81g consisting of outside holes having a large diameter and inside holes having a small diameter, and when the ring gear 80B is subjected to a process of insert molding using the center body 81A as an insert member, the synthetic resin material having a rigidity to be filled and solidified in the molding die is molded such that this material dose not project outside the peripheral wall 81a of the center body 81A from the stepped hole 81g. And thus as shown by FIG. 15 the resin material is filled and solidified in the whole area of inside of the stepped hole 81g and formed to be the contraction detent portion 84B, and these contraction detent portions 84B are fixed inside of the peripheral wall 81a of the center body 81A through the stepped holes 81g. As a result, as shown by FIG. 12 and FIG. 13, the engagement portion 30a and clearance grooves 30b for contraction detention are no longer required to be provided with on the valve housing 30B corresponding to the valve housing 30A as above and thus reduction of size and weight can be attained.

Embodiment 4

In the Embodiment 1, as connection means of the synthetic resin through holes 81d, 81e, 81f are provided and yet in place of these holes, means by bending up of cut away portion on protrusions can be used.

Embodiment 5

In the case of the embodiment 1, the rotation detent portions 83 are engaged to the valve housing 30, but it is also possible either to engage the rotation detent portions 83 to unshown recessed portions formed on the motor housing 9 on to engage them to both of the valve housing 30 and the motor housing 9.

According to the invention of claim 1, the ring gear comprises a center body having an rigidity and also comprises a teeth portion, rotation detent portions and contraction detent portions those of which are die molded with respect to the center body; and since the rotation detent portions and the contact detent ports are positioned with equidistance along the peripheral direction of the ring gear, accuracy of the circularity of the ring gear can be improved.

According to the invention of claim 2, since rotation detent portion and contraction detent portion are provided in plurality, respectively, strength of rotation detention and uniformity of contraction detention will be improved.

According to the invention of claim 3, since the contraction detent portion is formed to be a minimum size to be capable of flowing of the synthetic resin into a molding die, the material of synthetic resin of which the contraction detent is consisted can be reduced and in turn cost down can be attained.

According to the invention of claim 4, since the contraction detent portions are fixed to the center body, engagement portions and clearance grooves for contraction detentions can be removed from the valve housing, thereby reduction of size and weight of the valve housing can be attained.

According to the invention of claim 5, since the center body is made of a metal, the center body can be easily available.

According to the invention of claim 6, since the center body is formed by drawing, accuracy of engagement of the ring gear can be improved further.

According to the invention of claim 7, since the center body and the teeth portion are integrated to a single body by filling in and solidify the molding material of the teeth portion after the center body is placed in the molding space of a molding die, cost can be reduced further.

According to the invention of claim 8, since the center body is provided with a center hole to be arranged coaxially with the sun gear, the center body can be easily arranged coaxially with the ring gear and the sun gear.

According to the invention of claim 9, since the center body is provided with a peripheral wall which inscribably engage to both of the inner peripheral surface of the valve housing and that of the motor housing those of which from the inner space, the throttle valve and the motor can be properly fixed in a condition such that the throttle valve and the motor are kept to be prevented from the movement along radial direction through the ring gear.

According to the invention of claim 10, since the center body is provided with a connecting means of synthetic resin of the teeth portion, forming of a single body by integration of the center body and the teeth portion can be improved.

According to the invention of claim 11, since the connecting means of synthetic resin is a through hole, size of the ring gear can be reduced.

According to the invention of claim 12, since the outer peripheral surface of the center hole of the body is provided with engagement portions at which the teeth portion contact with the motor housing, fixation of the ring gear to the motor housing can be improved.

What is claimed is:

1. A throttle valve control device for an internal combustion engine comprising a gear train unit including a sun gear for transmitting the rotation of an output shaft to a valve shaft of a throttle valve, an inner teeth type ring gear and a planetary gear mating to said sun gear and said ring gear, wherein the ring gear and the planetary gear are arranged in a space formed by making a butt joint of a valve housing for said throttle valve for adjusting amount of intake air to said internal combustion engine and a motor housing of a motor for rotating said output shaft depending on an input of an accelerator pedal, wherein said ring gear comprises a center body having a rigidity, a teeth portion made of a synthetic resin being die molded with respect to said center body through a die, at least one rotation detent portion and at least on contraction detent portion for preventing said ring gear, which is stored in and fitted to at least either one of said valve housing or motor housing, from rotation along peripheral direction of said ring gear, and said rotation detent portion and said contraction detent portion are arranged with equal spacing along a peripheral direction of said ring gear.

2. A throttle valve control device for an international combustion engine according to claim 1, wherein said ring gear comprises a plurality of rotation detent portions and a plurality of contraction detent portions arranged with equal spacing along a peripheral direction of said ring gear.

3. A throttle valve control device for an internal combustion engine according to claim 1, wherein said contraction detent portion is formed by a synthetic resin within a minimum size which is defined by a flowable volume of said synthetic resin into a molding die.

4. A throttle valve control device for an internal combustion engine according to claim 1, wherein said contraction detent portion is fixed to said center body.

5. A throttle valve control device for an internal combustion engine according to claim 1, wherein said center body is made of a metal.

6. A throttle valve control device for an internal combustion engine according to claim 1, wherein said center body is formed by drawing.

7. A throttle valve control device for an internal combustion engine according to claim 1, wherein said center body and said teeth portion are integrated to a single body by filling in and solidifying a molding material of said teeth portion after placing said center portion into a molding space of a molding die of said teeth portion.

8. A throttle valve control device for an internal combustion engine according to claim 1, wherein said center body comprises a central hole portion for arranging said center body coaxially with said sun gear.

9. A throttle valve control device for an internal combustion engine according to claim 1, wherein said center body comprises a peripheral wall which engages inscribably with both of an inner peripheral surface of said valve housing and an inner peripheral surface of said motor housing, those of which form said inner space.

10. A throttle valve control device for an internal combustion engine according to claim 1, wherein said center body comprises a connecting means of synthetic resin of said teeth portion.

11. A throttle valve control device for an internal combustion engine according to claim 10, wherein said connecting means of synthetic resin is a through hole.

12. A throttle valve control device for an internal combustion engine according to claim 8, wherein said teeth portion comprises a engagement portion which contacts with said motor housing a on the outer peripheral surface of said central hole of said center body.

* * * * *